United States Patent
Ji et al.

(10) Patent No.: US 9,223,552 B2
(45) Date of Patent: Dec. 29, 2015

(54) COMPILING OPTIMIZATION OF AN APPLICATION AND COMPILER THEREOF

(71) Applicant: International Business Machines Corporation, Armonk, NY (US)

(72) Inventors: Jin Song Ji, Fujian (CN); Jian Jiang, Shanghai (CN); Ke Wen Lin, Shanghai (CN); Zhi Peng Liu, Haimen (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/259,599

(22) Filed: Apr. 23, 2014

(65) Prior Publication Data

US 2015/0052507 A1    Feb. 19, 2015

(30) Foreign Application Priority Data

Aug. 15, 2013    (CN) .......................... 2013 1 0356194

(51) Int. Cl.
*G06F 9/44*    (2006.01)
*G06F 9/45*    (2006.01)

(52) U.S. Cl.
CPC .................................... *G06F 8/4435* (2013.01)

(58) Field of Classification Search
None
See application file for complete search history.

(56) References Cited

U.S. PATENT DOCUMENTS

| | | | | |
|---|---|---|---|---|
| 7,840,950 B2* | 11/2010 | Stoodley et al. | ............... | 717/151 |
| 7,921,418 B2* | 4/2011 | Nair et al. | ..................... | 717/151 |
| 2002/0174418 A1* | 11/2002 | Ruf | .............................. | 717/155 |
| 2006/0200809 A1* | 9/2006 | Grcevski et al. | ............. | 717/140 |
| 2007/0240135 A1* | 10/2007 | Stoodley et al. | ............... | 717/140 |
| 2009/0119654 A1* | 5/2009 | Kawahito et al. | ............. | 717/154 |
| 2012/0233601 A1* | 9/2012 | Gounares et al. | ............. | 717/143 |

* cited by examiner

*Primary Examiner* — Isaac T Tecklu

(74) *Attorney, Agent, or Firm* — Cantor Colburn LLP; Edward Choi

(57) ABSTRACT

One aspect is a method for compiling optimization of an application and a compiler thereof. The method includes determining could-be-constant variables in source code of the application. Constant variables designated as final constant variables and values of the constant variables are obtained using the could-be-constant variables. The application is compiled using the constant variables and the values of the constant variables.

18 Claims, 4 Drawing Sheets

COMPILING OPTIMIZATION OF AN APPLICATION AND COMPILER THEREOF

PRIORITY

The present application claims priority to China Application No. 201310356194.4 filed on Aug. 15, 2013, and all the benefits accruing therefrom under 35 U.S.C. §119, the contents of which are incorporated by reference in its entirety herein.

BACKGROUND

The present invention relates to compiling an application in a computer system, and more specifically, to a method for a compiling optimization of an application.

Nowadays, an application needs to be capable of handling information coming from outside of the application as external information. The external information may include, but is not limited to, execution environment variables (e.g., variables representing operation system level, etc.), command-line input from a user, an external configuration file of the application, etc.

Usually, a developer of an application uses branch selection statements such as an IF/ELSE or SWITCH statement in source code to implement processing of the external information.

However, in some cases, the application may be required to always run on a stable environment or only be applied to one specific scenario. Thus, when the application is running, branch selection statements of related variables actually only run one branch statement, while other branch statement(s) become redundant. These redundant branch statements are still included in the application's executable file, thereby increasing the size of the executable file and slowing the overall performance of the application.

In order to avoid the above situations, a conventional method is to preprocess the source code of the application using a preprocessing command such as # ifdef prior to compiling the source code. The preprocessing command may help delete unwanted branches when compiling.

Such preprocessing is suitable for well-architected applications, but not suitable for non-well-architected applications including a large amount of legacy code. In addition, this preprocessing may lead to larger code, that is hard to read, and cannot adapt to all the scenarios flexibly.

SUMMARY

According to one aspect of the present invention, there is provided a method for compiling optimization of an application, which includes determining could-be-constant variables in source code of the application. Constant variables designated as final constant variables and values of the constant variables are obtained using the could-be-constant variables. The application is compiled using the constant variables and the values of the constant variables.

According to another aspect of the present invention, there is provided a compiler for compiling optimization of an application. The compiler includes a could-be-constant variable determination means configured to determine could-be-constant variables in source code of the application. The compiler also includes a constant variable obtaining means configured to obtain constant variables designated as final constant variables and values of the constant variables using the could-be-constant variables. The compiler further includes a compiling means configured to compile the application using the constant variables and the values of the constant variables.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
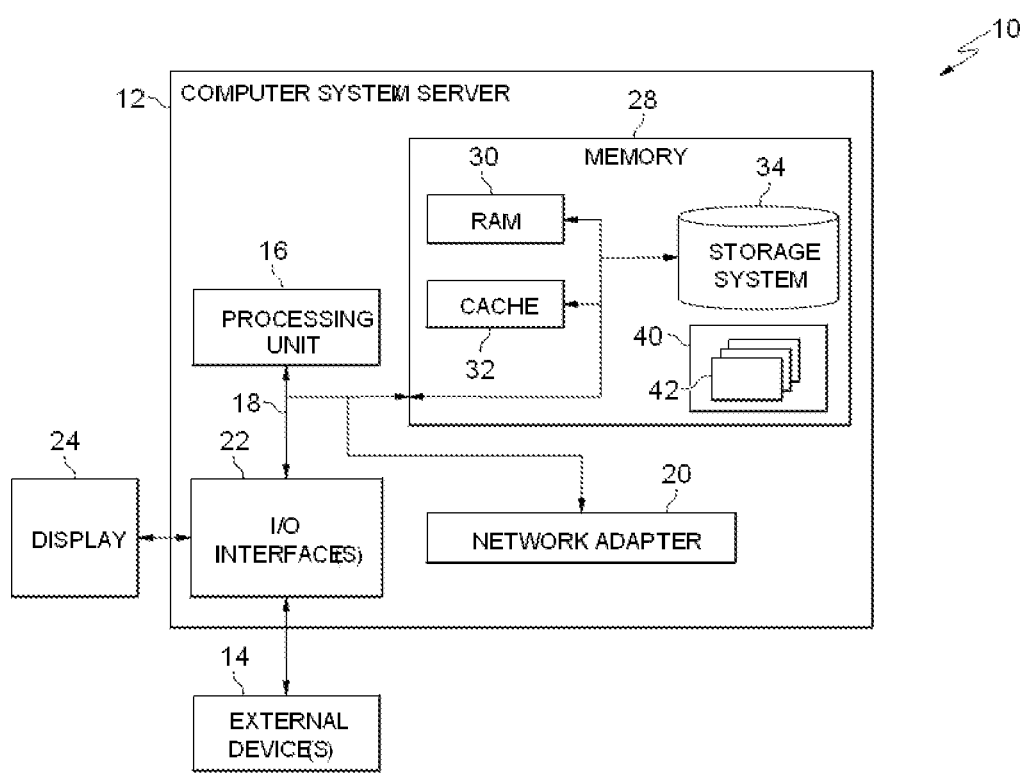
FIG. 1 shows a block diagram of an exemplary computer system/server 12 which is applicable to implement an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, so that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, so that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be executed on the computer, other programmable apparatus or other devices to produce a computer implemented process so that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
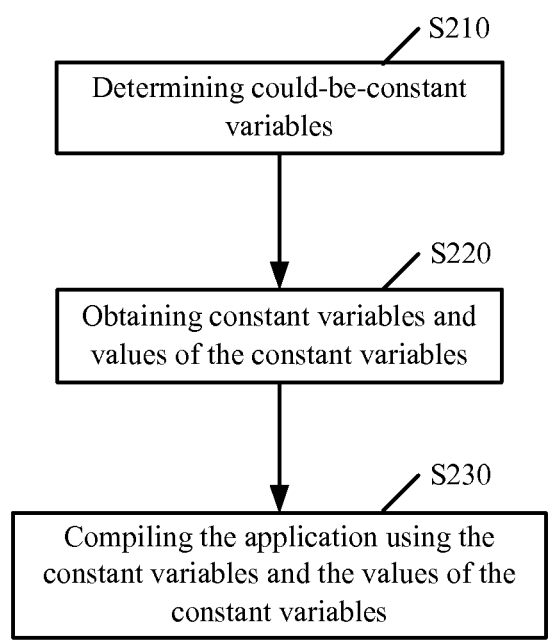
FIG. 2 is a schematic flowchart of the method for compiling optimization of an application according to an embodiment of the present invention.

FIG. 2 is a schematic flowchart of the method for compiling optimization of an application according to an embodiment of the present invention. The embodiment will be described in detail below in conjunction with the accompanying drawings.

An embodiment makes variables in source code of an application which can become constant during run time be constant in the compiling, so that invalid statements in the source code can be deleted without changing the source code, and execution files specific to various environments and scenarios can be generated.

Referring to FIG. 2, in step S210, could-be-constant variables are determined in the source code of the application. In this embodiment, "a could-be-constant variable" refers to the variable that can be safe to become constant during run time, that is, a variable having a uniquely determined constant value during run time.

Figure 3:
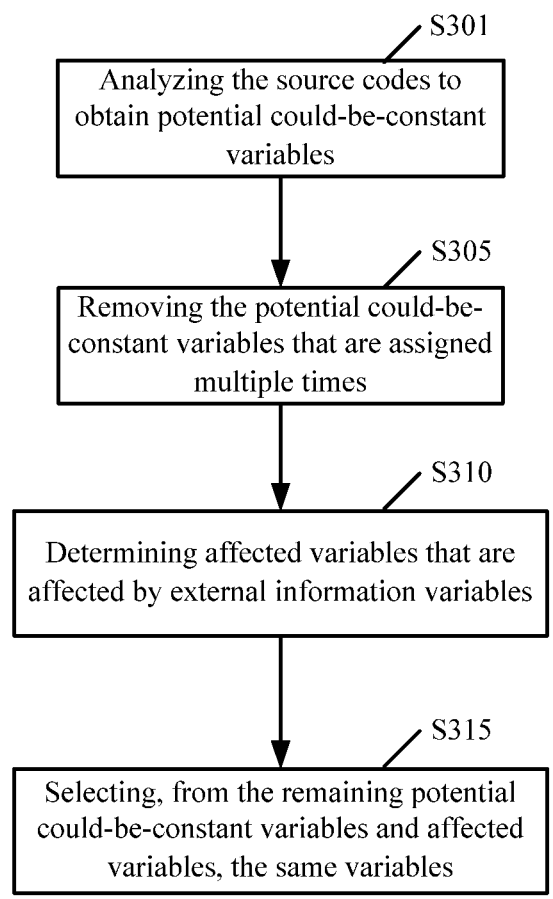
FIG. 3 is a schematic flowchart of the step of determining could-be-constant variables in the embodiment of FIG. 2.

FIG. 3 illustrates a schematic flowchart of step S210 of determining could-be-constant variables. As shown in FIG. 3, in step S301, the application's source code is analyzed to obtain potential could-be-constant variables. In this embodiment, "a potential could-be-constant variable" refers to the variable that possibly becomes the could-be-constant variable.

In one embodiment, first the source code is searched for a branch selection statement. The branch selection statement may be, for example, an IF/ELSE statement or SWITCH statement in C language. Next, the variables in the branch selection statement are extracted as the potential could-be-constant variables. After all the branch selection statements are found in the source code and the potential could-be-constant variables are obtained, a potential could-be-constant variable list may be generated to contain all the potential could-be-constant variables.

In another embodiment, first the source code is searched for a branch selection statement. As described above, the branch selection statement may be, for example, an IF/ELSE statement or SWITCH statement in C language. Next, it is determined whether there is a function call in the found branch selection statement. Then, if there is no function call in the branch selection statement, the variables in the branch selection statement are extracted as the potential could-be-constant variables. On the other hand, if it is determined that there is a function call in the branch selection statement, then it may be further determined if the called function is a function with definite semantics, namely, a function that can generate a definite value when being called. If it is determined that the called function is a function with definite semantics, the variables in the branch selection statement are extracted as the potential could-be-constant variables. Otherwise, if it is determined that the called function is not a function with definite semantics, the variables in the branch selection statement are not the potential could-be-constant variables. The above process is performed for all the branch selection statements in the source code, and a potential could-be-constant variable list can be generated to contain the obtained potential could-be-constant variables.

After the potential could-be-constant variables are obtained, a refining process may be further performed on these potential could-be-constant variables to remove the potential could-be-constant variables that may not be safe to become constant. Specifically, in step S305, the potential could-be-constant variables that are assigned multiple times are removed from the potential could-be-constant variables obtained in step S301. In one embodiment, the assignment operation is counted for each of the obtained potential could-be-constant variables. During the analysis of the source code, whenever an assignment statement is processed, the assignment count of the variable in the assignment state is incremented by 1. With the above process, the assignment count of each potential could-be-constant variable may be obtained. If the assignment count of a certain potential could-be-constant variable exceeds 1, it indicates that this potential could-be-constant variable cannot be safe to become constant during run time. Thus, the potential could-be-constant variables of which the count of the assignment operation exceeds 1 can be removed from the obtained potential could-be-constant variables.

Then, in step S310, affected variables that are affected by external information variables in the source code of the application are determined. In this embodiment, the external information variable refers to the variable representing information coming from outside, such as command line arguments, environment variables describing the application's run environment, parameter variables in an external configuration file of the application.

In one embodiment, first, in the application's source code, the command line arguments or environment variables or parameter variables in an external configuration file of the application are searched for, as the external information variables. Then, in the source code, the variables that are assigned directly by these external information variables are searched for, as directly affected variables. Then, the variables that are assigned as the constants through constant propagation when the directly affected variables are considered as the constants are searched for, as indirectly affected variables. The directly affected variables and indirectly affected variables constitute the affected variables. In practice, an external information affected variable list may be generated to contain the above affected variables. Optionally, the external information variables may also be contained in the above list.

Although the description is given above in the order of steps S301, S305 and S310, those skilled in the art readily know that the order of execution of the above steps S301, S305 and S310 is not limited thereto.

Next, in step S315, the same variables are selected from the remaining potential could-be-constant variables and the affected variables, as the could-be-constant variables. Through the above steps S301, S305 and S310, the refined potential could-be-constant variable list and the external information affected variable list can be obtained. Therefore, the could-be-constant variables are the variables that appear in both the potential could-be-constant variable list and the external information affected variable list.

The process of determining the could-be-constant variables will be described below by way of two examples.

EXAMPLE 1

Assume that a part of the application's source code is shown as below:

```
#include <stdlib.h>
#include <string.h>
#include <iostream>
```

```
using namespace std;
int handleExtArg(int argc,char *argv[ ])
{
    char* langlvl = argv[1];
    if(strcmp(langlvl,"extc89")){
        handleExtC89( );
    }else if(strcmp(langlvl,"extc99")){
        handleExtC99( );
    }else if(strcmp(langlvl,"classic")){
        handleClassic( );
    }else if(strcmp(langlvl,...)){
        ...
    }else{
    ...
}
```

First, the source code is searched for a branch selection statement, and one IF/ELSE statement may be obtained, which has four branches. In each branch statement, there exists a call for function "strcmp( )", and the function "strcmp( )" is a string comparison function, which has the definite semantics, whereby the potential could-be-constant variable is variable "langlvl" in the found IF/ELSE statement. As there is only one assignment operation for the variable "langlvl", the refined potential could-be-constant variable is still the variable "langlvl". Then, the external information variable and affected variable are searched for in the source code. "argv[1]" represents the first parameter of the command line input and hence belongs to the external information variable. The variable affected by the variable "argv[1]" is "langlvl". Therefore, the external information variable "argv [1]" and the affected variable "langlvl" are obtained. Finally, it may be determined that the could-be-constant variable is "langlvl".

EXAMPLE 2

Assume that a part of the application's source code is shown as below:

```
#include <stdlib.h>
#include <string.h>
#include <iostream>
using namespace std;
#define FORMAT_BIN 2
#define FORMAT_OCT 8
#define FORMAT_DEC 10
#define FORMAT_HEX 16
int handleExtArg(int argc,char *argv[ ])
{
    char* langlvl = argv[1];
    if(strcmp(langlvl,"extc89")){
        handleExtC89( );
    }else if(strcmp(langlvl,"extc99")){
        handleExtC99( );
    }else if(strcmp(langlvl,"classic")){
        handleClassic( );
    }else if(strcmp(langlvl,...)){
        ...
    }else{
    ...
}
int outFormat = argv[2];
int flag = false;
if(checkPrev( )&&isSupportLd( )){
flag = true;
....
}
if(flag){
if((outFormat==FORMAT_HEX))
handleLongDouble( );
else{...}
```

```
}
flag = false;
if(isSupportAssert( )){
...
flag = true;
}
if(flag){
...
}
}
```

First, the source code is searched for a branch selection statement, and five IF/ELSE statements may be obtained. There are functional calls in three IF/ELSE statements, including function "strcmp( )", function "checkPrev( )", function "isSupportLd( )" and function "isSupportAssert( )". As mentioned above, the function "strcmp( )" is the function with definite semantics, whereby the corresponding variable "langlvl" is the potential could-be-constant variable. There is no function call in the other two IF/ELSE statements, whereby the variables "flag", "outFormat" are the potential could-be-constant variables. Thus, the potential could-be-constant variables are the variables "langlvl", "flag", "outFormat". Next, the assignment operations of the above variables are counted. The assignment count of the variable "langlvl" is 1, the assignment count of the variable "flag" is 4, and the assignment count of the variable "outFormat" is 1, whereby the variable "flag" is removed from the current potential could-be-constant variables. Thus, the refined potential could-be-constant variables are the variables "langlvl", "outFormat". Then, the external information variable and affected variable are searched for. As "argv[ ]" represents the command line argument, the external information variables are the variables "argv[1]", "argv [2]". Accordingly, the affected variables are the variables "langlvl", "outFormat". Based on the obtained potential could-be-constant variables and affected variables, it may be determined that the could-be-constant variables are variables "langlvl", "outFormat".

Returning to FIG. 2, after obtaining the could-be-constant variables, in step S220, constant variables designated as final constant variables and values of the constant variables are obtained using the obtained could-be-constant variables.

In one embodiment, the obtained could-be-constant variables may be presented to the developer of the application, for example. Specifically, the obtained could-be-constant variables, including variable names, positions, dependencies, etc. of the could-be-constant variables are formed into a template to be provided to the developer. Then, the application's developer may modify the template to designate which could-be-constant variables are the constant variables and to determine the corresponding values. The modified template records the constant variables and their values, as an external configuration file for the subsequent compiling. In the present embodiment, the final constant variables and their values are determined by accepting the designation of the constant variables and their values from the developer.

In another embodiment, first, an external configuration file for compiling is read. The external configuration file describes the variables to be constant in the application and their values. Then, in the could-be-constant variables, the could-be-constant variables that are same as the variables in the external configuration file may be determined as final constant variables. Accordingly, the values of the constant variables can be obtained.

Then, in step S230, the application is compiled using the constant variables and their values obtained in step S220.

Since which variables in the application's source code are the constants have been already known, existing optimization methods such as constant folding, dead code elimination, etc. may be used during the compiling to remove the redundant branches of the branch selection statements.

It can be seen from the above description that the method for compiling optimization of an application of the present embodiment can implement customization of the application for particular run environments and scenarios without modifying the application's source code or compiling redundant code by determining the variables that can become constant during run time before compiling the application and then compiling the application, and has advantages of low cost and safety. In addition, the method of the embodiment can also be applicable to the applications having a large amount of legacy code.

Figure 4:
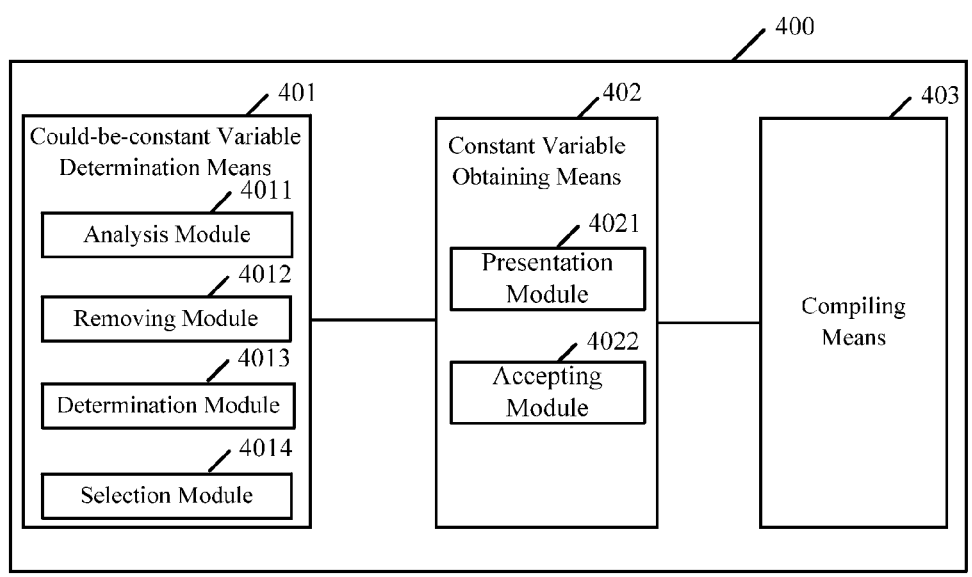
FIG. 4 is a schematic block diagram of the compiler for compiling optimization of an application according to an embodiment of the present invention.

FIG. 4 illustrates a schematic block diagram of a compiler 400 for compiling optimization of an application according to an embodiment of the present invention.

As shown in FIG. 4, the compiler 400 of the present embodiment can include: a could-be-constant variable determination means 401, which is configured to determine the could-be-constant variables in the application's source code; a constant variable obtaining means 402, which is configured to obtain the constant variables designated as final constant variables and values of the constant variables using the could-be-constant variables determined in the could-be-constant variable determination means 401; and a compiling means 403, which is configured compile the application using the constant variables and their values.

In this embodiment, in the could-be-constant variable determination means 401, an analysis module 4011 analyzes the application's source code to obtain the potential could-be-constant variables.

In one embodiment, in the analysis module 4011, a searching unit searches the source code for a branch selection statement, and then, an extracting unit extracts the variables in the branch selection statement as the potential could-be-constant variables.

In another embodiment, in the analysis module 4011, the searching unit searches the source code for a branch selection statement. If there is the function call in the branch selection statement and the called function is the function with definite semantics, the extracting unit extracts the variables in the branch selection statement as the potential could-be-constant variables. If there is no function call in the branch selection statement, the extracting unit extracts the variables in the branch selection statement as the potential could-be-constant variables.

Then, a removing module 4012 removes, from the potential could-be-constant variables obtained by the analysis module 4011, the potential could-be-constant variables that are assigned multiple times. In one embodiment, in the removing module 4012, a counting unit counts the assignment operations of the obtained potential could-be-constant variables. Then, the removing unit removes the potential could-be-constant variable of which the count of the assignment operation exceeds 1.

In addition, in the could-be-constant variable determination means 401, a determination module 4013 determines the affected variables that are affected by the external information variables according to the application's source code. In one embodiment, in the determination module 4013, a first searching unit searches the source code for the command line arguments or environment variables or parameter variables in the application's external configuration file, as the external information variables, and the second searching unit searches the source code for the variables assigned directly by the external information variables found by the first searching unit, as the directly affected variables, and searches for the variables that are assigned as the constants through constant propagation when the directly affected variables are considered as the constants, as the indirectly affected variables. The directly affected variables and indirectly affected variables constitute the entire affected variables.

Then, a selection module 4014 selects, from the potential could-be-constant variables remaining after the removing module 4012 and the affected variables determined by the determination module 4013, the same variables as the could-be-constant variables.

The could-be-constant variables determined by the could-be-constant variable determination means 401 are provided to the constant variable obtaining means 402.

In one embodiment, in the constant variable obtaining means 402, a presentation module 4021 presents the determined could-be-constant variables to the developer of the application, for example, and an accepting module 4022 accepts the designation of the constant variables and their values in the could-be-constant variables.

In another embodiment, in the constant variable obtaining means 402, a reading module reads an external configuration file for compiling, which describes the variables to be constant and their values. Then, a constant variable determination module determines, in the could-be-constant variables, the could-be-constant variables that are identical with the variables in the external configuration file read as the constant variables, and may accordingly determine the values of the constant variables.

After the constant variable obtaining means 402 obtains the constant variables and their values, the compiling means 403 compiles the application using the obtained constant variables and their values. Since the compiling means 403 has already known which variables become the constants and the values of these constants, the compiling means 403 may use optimization methods such as constant folding, dead code elimination, etc. for compiling optimization.

It should be noted that the compiler 400 of the present embodiment can operatively implement the method for compiling optimization of an application shown in FIG. 2 and FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that execute the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for compiling optimization of an application, comprising:
   determining could-be-constant variables in source code of the application, the could-be-constant variables each having a uniquely determined constant value during run time, wherein the determining comprises:
      analyzing the source code to obtain potential could-be-constant variables;
      removing the potential could-be-constant variables that are assigned multiple times from the potential could-be-constant variables by counting assignment operations of the potential could-be-constant variables and removing the potential could-be-constant of which the count of the assignment operations exceeds one, resulting in a list of remaining potential could-be-constant variables;
      determining affected variables that are affected by external information variables in the source code, the external information variables comprising information received from outside of the application; and
      selecting matching variables from the remaining potential could-be-constant variables and the affected variables as the could-be-constant variables;
   obtaining constant variables designated as final constant variables and values of the constant variables using the could-be-constant variables; and
   compiling the application using the constant variables and the values of the constant variables.

2. The method according to claim 1, wherein the analyzing of the source code to obtain potential could-be-constant variables comprises:
   searching the source code for a branch selection statement; and
   extracting variables in the branch select statement as the potential could-be-constant variables.

3. The method according to claim 1, wherein the analyzing of the source code to obtain potential could-be-constant variables comprises:
   searching the source code for a branch selection statement;
   based on determining that there is no function call in the branch selection statement, extracting variables in the branch selection statement as the potential could-be-constant variables; and
   based on determining that there is a function call in the branch selection statement and the called function is a function with definite semantics, extracting variables in the branch selection statement as the potential could-be-constant variables.

4. The method according to claim 1, wherein the determining of affected variables affected by external information variables in the source code comprises:
   searching the source code for command line arguments or environment variables describing the application's run environment or parameter variables in an external configuration file of the application as the external information variables;
   searching for variables that are assigned directly by the external information variables, as directly affected variables; and
   searching for variables that are assigned as constants through constant propagation when the directly affected variables are considered as constants, as indirectly affected variables;
   wherein the affected variables include the directly affected variables and the indirectly affected variables.

5. The method according to claim 1, wherein the obtaining of the constant variables designated as final constant variables and values of the constant variables using the could-be-constant variables comprises:
   presenting the could-be-constant variables; and
   accepting the designation of the constant variables and values of the constant variables in the could-be-constant variables.

6. The method according to claim 1, wherein the obtaining of the constant variables designated as final constant variables and values of the constant variables using the could-be-constant variables comprises:
   reading an external configuration file describing the variables to be constant and their values; and
   determining the could-be-constant variables that are identical with the variables in the external configuration file in the could-be-constant variables as the constant variables.

7. A system for compiling optimization of an application, the system comprising:
   a processor operable to execute a plurality of instructions; and
   a system memory that stores the instructions to implement a compiler upon execution by the processor, the compiler comprising:
      a could-be-constant variable determination means configured to determine could-be-constant variables in source code of the application, the could-be-constant variables each having a uniquely determined constant value during run time, wherein the could-be-constant variable determination means comprises:
         an analysis module configured to analyze the source code to obtain potential could-be-constant variables;
         a removing module configured to remove the potential could-be-constant variables that are assigned multiple times from the potential could-be-constant variables by counting assignment operations of the potential could-be-constant variables and removing the potential could-be-constant of which the count of the assignment operations exceeds one, resulting in a list of remaining potential could-be-constant variables;
         a determination module configured to determine affected variables that are affected by external information variables in the source code, the external information variables comprising information received from outside of the application; and
         a selection module to select matching variables from the remaining potential could-be-constant variables and the affected variables as the could-be-constant variables;
      a constant variable obtaining means configured to obtain constant variables designated as final constant variables and values of the constant variables using the could-be-constant variables; and
      a compiling means configured to compile the application using the constant variables and the values of the constant variables.

8. The system according to claim 7, wherein the analysis module comprises:
   a searching unit configured to search the source code for a branch selection statement; and an extracting unit configured to extract variables in the branch select statement as the potential could-be-constant variables.

9. The system according to claim 7, wherein the analysis module comprises:
a searching unit configured to search the source code for a branch selection statement; and
an extracting unit configured to extract, if there is no function call in the branch selection statement, variables in the branch selection statement as the potential could-be-constant variables, and to extract, if there is a function call in the branch selection statement and the called function is a function with definite semantics, variables in the branch selection statement as the potential could-be-constant variables.

10. The system according to claim 7, wherein the determination module comprises:
a first searching unit configured to search the source code for command line arguments or environment variables describing the application's run environment or parameter variables in an external configuration file of the application as the external information variables; and
a second searching unit configured to search for variables that are assigned directly by the external information variables, as directly affected variables, and to search for variables that are assigned as constants through constant propagation when the directly affected variables are considered as constants, as indirectly affected variables;
wherein the affected variables include the directly affected variables and the indirectly affected variables.

11. The system according to claim 7, wherein the constant variable obtaining means comprises:
a presenting module configured to present the could-be-constant variables; and
an accepting module configured to accept the designation of the constant variables and the values of the constant variables in the could-be-constant variables.

12. The system according to claim 7, wherein the constant variable obtaining means comprises:
a reading module configured to read an external configuration file describing variables to be constant and their values; and
a constant variable determination module configured to determine the could-be-constant variables that are identical with the variables in the external configuration file in the could-be-constant variables as the constant variables.

13. A computer program product for compiling optimization of an application, the computer program product comprising a non-transitory computer readable storage medium having program code embodied therewith, the program code executable by a computer processor for:
determining could-be-constant variables in source code of the application, the could-be-constant variables each having a uniquely determined constant value during run time, wherein the determining comprises:
analyzing the source code to obtain potential could-be-constant variables;
removing the potential could-be-constant variables that are assigned multiple times from the potential could-be-constant variables by counting assignment operations of the potential could-be-constant variables and removing the potential could-be-constant of which the count of the assignment operations exceeds one, resulting in a list of remaining potential could-be-constant variables;
determining affected variables that are affected by external information variables in the source code, the external information variables comprising information received from outside of the application; and
selecting matching variables from the remaining potential could-be-constant variables and the affected variables as the could-be-constant variables;
obtaining constant variables designated as final constant variables and values of the constant variables using the could-be-constant variables; and
compiling the application using the constant variables and the values of the constant variables.

14. The computer program product of claim 13, wherein the analyzing of the source code to obtain potential could-be-constant variables comprises:
searching the source code for a branch selection statement; and
extracting variables in the branch select statement as the potential could-be-constant variables.

15. The computer program product of claim 13, wherein the analyzing of the source code to obtain potential could-be-constant variables comprises:
searching the source code for a branch selection statement;
based on determining that there is no function call in the branch selection statement, extracting variables in the branch selection statement as the potential could-be-constant variables; and
based on determining that there is a function call in the branch selection statement and the called function is a function with definite semantics, extracting variables in the branch selection statement as the potential could-be-constant variables.

16. The computer program product of claim 13, wherein the determining of affected variables affected by external information variables in the source code comprises:
searching the source code for command line arguments or environment variables describing the application's run environment or parameter variables in an external configuration file of the application as the external information variables;
searching for variables that are assigned directly by the external information variables, as directly affected variables; and
searching for variables that are assigned as constants through constant propagation when the directly affected variables are considered as constants, as indirectly affected variables;
wherein the affected variables include the directly affected variables and the indirectly affected variables.

17. The computer program product of claim 13, wherein the obtaining of the constant variables designated as final constant variables and values of the constant variables using the could-be-constant variables comprises:
presenting the could-be-constant variables; and
accepting the designation of the constant variables and values of the constant variables in the could-be-constant variables.

18. The computer program product of claim 13, wherein the obtaining of the constant variables designated as final constant variables and values of the constant variables using the could-be-constant variables comprises:
reading an external configuration file describing the variables to be constant and their values; and
determining the could-be-constant variables that are identical with the variables in the external configuration file in the could-be-constant variables as the constant variables.

* * * * *